(12) United States Patent
Jacob

(10) Patent No.: US 8,661,892 B2
(45) Date of Patent: Mar. 4, 2014

(54) FILLING-LEVEL MEASURING DEVICE

(75) Inventor: Joern Jacob, Kirnbach (DE)

(73) Assignee: Vega Grieshaber KG, Wolfach (DE)

( * ) Notice: Subject to any disclaimer, the term of this patent is extended or adjusted under 35 U.S.C. 154(b) by 163 days.

(21) Appl. No.: 13/245,336

(22) Filed: Sep. 26, 2011

(65) Prior Publication Data

US 2012/0160025 A1    Jun. 28, 2012

Related U.S. Application Data

(60) Provisional application No. 61/436,568, filed on Jan. 26, 2011.

(30) Foreign Application Priority Data

Dec. 22, 2010    (EP) ................................... 10 015 941

(51) Int. Cl.
G01F 23/26    (2006.01)

(52) U.S. Cl.
USPC .............................. 73/304 C; 73/701; 73/708

(58) Field of Classification Search
USPC ....................... 73/304 C, 701, 708
See application file for complete search history.

(56) References Cited

U.S. PATENT DOCUMENTS

| 4,128,013 | A | * | 12/1978 | Perry | 73/701 |
| 5,701,932 | A | * | 12/1997 | Bourscheid et al. | 137/558 |
| 6,698,294 | B2 | * | 3/2004 | Jacob et al. | 73/708 |
| 8,099,249 | B2 | * | 1/2012 | Jacob et al. | 702/50 |

FOREIGN PATENT DOCUMENTS

| DE | 10147044 | 5/2002 |
| DE | 20 2004 007 128 | 10/2004 |

OTHER PUBLICATIONS

Office Action, EP 10015941.7 mailed Jul. 5, 2011, (6 pages—German; 3 pages—English).

* cited by examiner

*Primary Examiner* — Hezron E Williams
*Assistant Examiner* — Hoang Nguyen
(74) *Attorney, Agent, or Firm* — Andrew F. Young, Esq.; Lackenbach Siegel, LLP

(57) ABSTRACT

Filling-level measurement device with a housing and a measurement cell arranged inside the housing, wherein the measurement cell comprises an essentially cylindrical measurement cell body, which comprises a membrane arranged crosswise relative to a longitudinal axis of the measurement cell body, wherein the measurement cell is mounted in the housing by a circumferential sealing element, which is arranged between the measurement cell body and the housing, wherein the sealing element is arranged in axial direction of the measurement cell in such a way that a measurement signal emitted by the measurement cell is independent from a compression of the sealing element.

19 Claims, 3 Drawing Sheets

| Dichtung Typ | Therm. Hyst. % | Therm. Hyst. % | Np$_{Start}$ % | Np$_{10}$ % | Np$_{50}$ % | Np$_{100}$ % | -Drift % |
|---|---|---|---|---|---|---|---|
| Radial Standard | -0,07 | -0,064 | 0,00 | -0,02 | -0,01 | -0,06 | -0,066 |
|  | -0,06 |  | 0,01 | 0,01 | -0,01 | -0,04 |  |
|  | -0,04 |  | -0,01 | -0,03 | -0,05 | -0,11 |  |
|  | -0,08 |  | -0,01 | -0,03 | -0,05 | -0,10 |  |
|  | -0,07 |  | -0,03 | -0,02 | -0,02 | -0,06 |  |
| Radial 2,7mm forwards | -0,04 | -0,020 | 0,01 | 0,00 | -0,01 | -0,03 | -0,036 |
|  | -0,02 |  | 0,00 | 0,00 | -0,01 | -0,02 |  |
|  | 0,00 |  | -0,01 | -0,02 | 0,00 | -0,04 |  |
|  | -0,05 |  | 0,01 | -0,01 | -0,02 | -0,06 |  |
|  | 0,01 |  | 0,01 | 0,00 | 0,01 | -0,01 |  |

FILLING-LEVEL MEASURING DEVICE

CROSS REFERENCE TO RELATED APPLICATIONS

This application claims priority from European Patent App. Ser. No. 10 015 941.7 filed Dec. 22, 2010 and from U.S. Prov. Ser. No. 61/436,568 filed Jan. 26, 2011, the entire contents of each of which are incorporated herein fully by reference.

FIGURE SELECTED FOR PUBLICATION

FIG. 1

BACKGROUND OF THE INVENTION

1. Field of the Invention

The present invention relates to a filling-level measuring device. More specifically, the present invention relates to a filling-level measuring device having a housing and a measurement cell arranged therein, wherein the cell further comprises an essentially cylindrical measurement cell body with a membrane arranged crosswise relative to a longitudinal axis of the cell body. The measurement cell is mounted in the housing by means of a circumferential sealing element, which is arranged between the cell body and the housing.

2. Description of the Related Art

The related art involves filling level measuring devices. Such devices are known from the prior art and comprise a substantially cylindrical housing, in which a front-side measurement cell is arranged in the direction of a process environment. The measurement cell comprises a substantially cylindrical measurement cell body, which ordinarily comprises a front-side membrane arranged crosswise relative to a longitudinal axis of the measurement cell body. The measurement cell is mounted in the housing of the filling-level measuring device by means of a circumferential sealing element, which is arranged between the measurement cell body and the housing.

To be able to achieve sufficient seal tightness of the filling-level measuring device it is necessary that the sealing element, which, by way of example, can be provided as an O-ring, is compressed to develop a sealing effect. By way of the compression of the sealing element, forces are fed into the measurement cell in radial direction, which vary depending on the ambient temperature, which has a significant influence on an expansion of the sealing element. By means of such variation of the fed-in forces, an output signal of the measurement cell is distorted.

To date, it has been attempted to keep a change of the measurement signal—caused by strain as well as fluctuations in temperature—small, by placing the sealing element as far as possible behind the glass seam, the joining location between the membrane, and the measurement cell body. For a measurement cell with an extension of about 10 mm, the sealing element was thus arranged staggered to the back with a distance of 5 mm to the joining location. In addition, it was also attempted to feed thermally conditioned volume changes of the sealing element through a lower biasing voltage of the same to a lesser degree into the measurement cell body.

A lower biasing compression of the sealing element admittedly causes a lower temperature dependant zero point offset of the measurement signal; but, what is not appreciated by the prior art is that the lower biasing compression has simultaneous effects on the long term seal tightness of the measurement cell. Furthermore, with increasing age of the sealing element, its elasticity and with this a bias compression between the housing and the measurement cell body, decreases, so that a further offset of the measurement cell's zero point can be expected. A measurement exactness of the known filling-level measurement devices is thus limited by the aging of the sealing elements, as well.

Accordingly, there is a need for an improved filling-level measurement device which corrects the above referenced disadvantages and provides a thermally stable assembly with sufficient long term stability.

ASPECTS AND SUMMARY OF THE INVENTION

An aspect of the present invention is to correct the above referenced disadvantages and to provide a thermally stable assembly with sufficient long term stability.

Another aspect of the present invention is to provide an increased seal tightness of the filling-level measurement device, as well as an increased measurement precision.

The present invention relates to a filling-level measuring device comprising a housing and a measurement cell arranged in the housing, wherein the measurement cell has a substantially cylindrical measurement cell body, which comprises a membrane arranged crosswise relative to a longitudinal axis of the measurement cell body, and wherein the measurement cell is mounted in the housing by means of a circumferential sealing element, which is arranged between the measurement cell body and the housing. The sealing element is arranged in axial direction of the measurement cell body, according to the invention, in that a measurement signal emitted from the measurement cell is independent from a compression of the sealing element.

By means of an assembly of the sealing element, according to the present invention, at the circumference of the measurement body, with a distance which can be determined, for example, by simulation or empirical evaluation, of a joining location between the membrane and the measurement body, it is possible to substantially decouple an output signal of the measurement cell from a radial force impact, which is caused by a compression of the sealing element. In doing so, it is achieved that a stable zero point of the measurement cell can be ensured independent from a clamping of the measurement cell by the sealing element. The achieved measurement results of the filling-level measurement device are thus independent from a temperature dependant extension of the sealing element as well as from an age related reduction of the clamping force of the same. Therefore, an increased seal tightness of the filling-level measurement device, an increased long-term stability of the device per se, as well as an increased measurement precision can be achieved.

A particularly cost effective assembly of the filling-level measurement device, as well as a simultaneously reliable mounting of the measurement cell inside the housing is achieved, if an O-ring is employed as sealing element. Principally, form seals are also conceivable as sealing elements.

To be able to achieve a better strain of the sealing element and to simultaneously better protect it from mechanical influences from the direction of a process environment, it is advantageous for the housing to comprise a front side continuous protuberance. The protuberance is preferably collar-shaped and extends in a radial direction.

This way ensures that damage from the direction of the process environment is prevented by arranging the sealing element below this continuous protuberance, and simultaneously prevents that the sealing element is exhausted in the direction of the process environment in case of fluctuating pressures.

It is advantageous if the measurement cell is additionally mounted by a back-side and circumferential holding ring.

Such a holding ring can be boltable with the housing, and with a back-side continuous shoulder for support of the measurement cell, for example. To achieve an increased seal tightness of the assembly and to ensure a stable mounting of the measurement cell, it is advantageous if the holding ring is provided in such a way that it biases the sealing element with a back-side pressure. For this purpose, the holding ring can comprise a compression section, for example, which extends the holding ring in the direction of the sealing element, so that the sealing element is compressed in axial direction, i.e. the direction of the continuous protuberance of the housing, when inserting the holding ring. In this way, an additional force impact is achieved in radial direction of the measurement cell housing.

The present invention is especially advantageous if the measurement cell is a capacitive measurement cell made of ceramic material.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
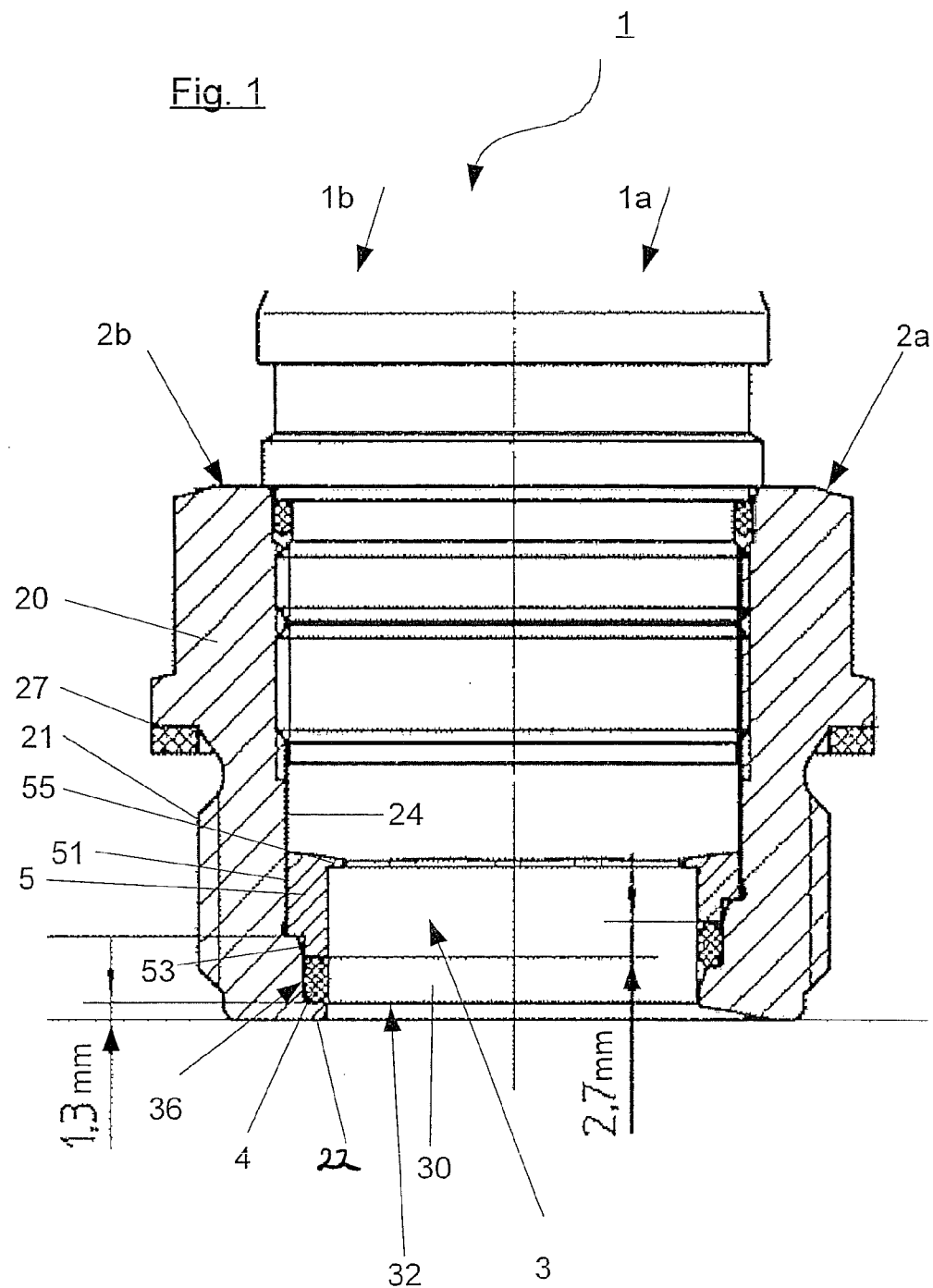
FIG. 1 shows a split cross-section, wherein a filling-level measurement device according to the prior art is shown on the right side, and a filling-level measurement devices according to the present invention is shown on the left side.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

FIG. 1 shows a split cross-section of a filling-level measurement device 1, wherein a filling-level measurement device 1a, according to the prior art, is shown in the right half of the cross section; and, a filling-level measurement device 1b, according to the present invention, is shown in the left half of the cross section. Each contains a cylindrical housing, shown respectively 2a and 2b.

The filling-level measurement device 1a, according to the prior art, and the filling-level measurement device 1b, according to the present invention, are constructed as shown and differ in the shown cross-section by the mounting of a sealing element 4 in different critical installation depths. Due to this reason, the following refers only to the filling-level measurement device 1b according to the present invention.

The filling-level measurement device 1b comprises an essentially cylindrical housing 2b with a housing body 20, which shows a front-side external threading 21 for screwing the filling-level measurement device 1b into a tank or a pipe line, for example. A shoulder 27 is provided behind the external threading 21 to limit a screw-in depth of housing 2b. A shoulder 27 has a continuous form seal and simultaneously ensures a sealing of housing 2b with respect to a process environment (not shown).

A measurement cell 3 is arranged within the housing 2b. Measurement cell 3 comprises a cylindrical measurement cell body 30, which is supported by a front-side membrane 32 for accepting and forwarding of a pressure prevailing in the measurement environment. Membrane 32 is arranged perpendicular to a longitudinal axis of the measurement cell body 30 and connected at its circumference to the measurement cell body 30 by means of a welding seam 34 (See FIG. 2).

The measurement cell body 30 is mounted within the housing body 20 by means of a sealing element 4, which is arranged between the measurement cell body 30 and the housing body 20. The sealing element 4 is provided as an O-ring in the description of this embodiment, but is not limited to such.

The O-ring 4 is supported by a front-side continuous protuberance 22, which is formed to the housing body 20 at the front side, and protected from influences from the process environment. Measurement cell 3 is additionally mounted from the back side by a holding ring 5, which can be screwed into the housing body 20, and mounted to the back side by a revolving support section 55. Holding ring 5 comprises a front-side compression section 53, which extends the holding ring 5 in the direction of the O-ring 4 and exerts an additional pressure to the O-ring 4 in the direction of the protuberance (or continuous margin) 22 when screwing the holding ring into the housing body 20. An additional clamping force in a radial direction of the measurement cell body 30 is achieved by compressing the O-ring 4 in an axial direction, so that an increased seal tightness effect is achieved.

The O-ring 4 is mounted in axial direction of the measurement cell 3 in a installation depth Y in that a force fed into measurement cell 3 by the O-ring 4 in radial direction has no effect on a measurement result of the measurement cell. This is achieved in that the O-ring 4 is arranged in a way that the radial directed force is introduced at a point into the housing at which no force impact is created at membrane 32, which is connected to the measurement cell body 30. As a result, the membrane 32 experiences no deflection component, which is dependent on this force effect.

The prior art filling-level measurement device 1a is indicated as radial standard, while the filling-level measurement device 1b, according to the present invention, is indicated as radial 2.7 mm forward.

Figures 2, 3:
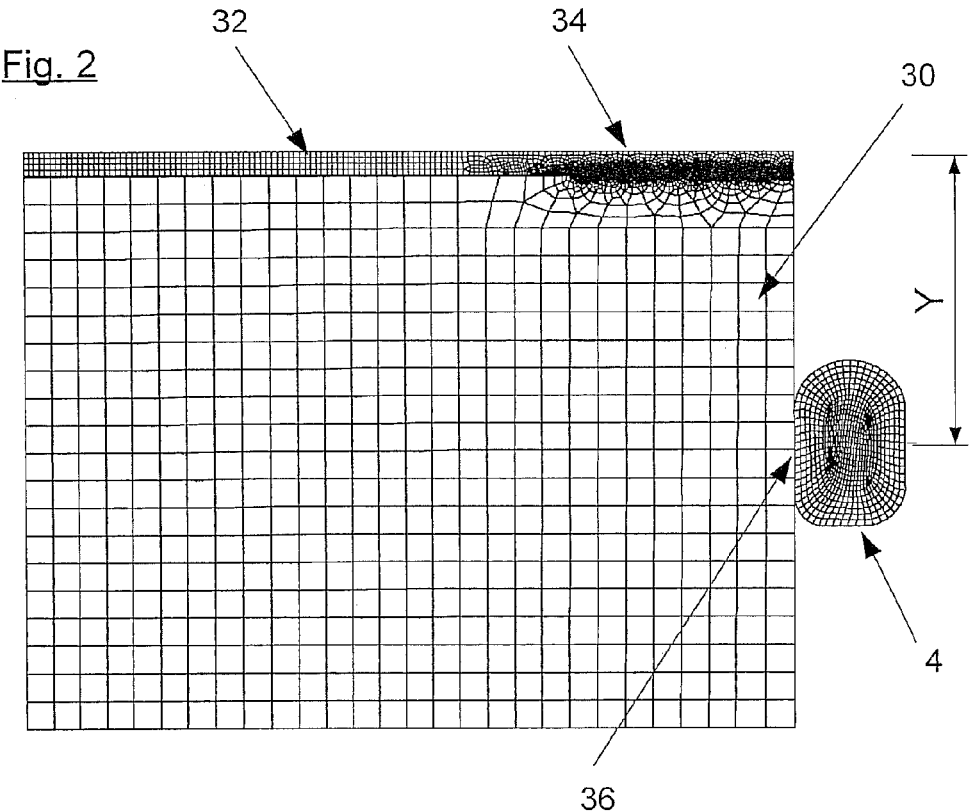
FIG. 2 shows an enlarged illustration of the measurement cell in the form of a FEM simulation.
FIG. 3 shows a measurement value table for comparison of a measurement cell according to the prior art and a measurement cell according to the present invention.

FIG. 2 shows an enlarged illustration of the measurement cell 3 from FIG. 1, wherein the measurement cell 3 is rotated by 180° in the present illustration, i.e. shown with the membrane 32 aligned upwards.

The present illustration is a section of a finite element simulation of the clamped measurement cell 3, wherein the sealing element 4 in terms of the invention is arranged optimally. An axial distance Y, of the sealing element 4, from the membrane 32, is therefore chosen in a way that radial acting forces, which are fed into the measurement body 30 by means of the sealing element 4, have no effect onto a deflection of membrane 32, and thus guarantee a stable zero point of measurement cell 3, and thus a stable measurement curve. A joining location or welding seam 34 is shown along the periphery of the membrane 32.

A minimal zero point offset, also called neutral point 36, is constituted for the installation depth Y, so that an optimal temperature and long-term stability of the filling-measurement device can be achieved.

FIG. 3 shows a table with measurement values of 5 respective filling-level measurement devices 1a according to the prior art and according to the present invention 1b. The zero point offset is shown as a percentage depending on an amount of implemented 0° to 100° temperature cycles. Whereas, at the time of $Np_{Start}$, no significant difference is discernible between the filling-level measurement devices 1a according to the prior art (indicated with radial standard), and the filling-level measurement devices 1b according to the present invention (indicated as radial 2.7 mm forwards), it is already discernible after 10 completed temperature cycles that an arrangement of the O-ring 4 according to the present invention causes a significant decrease of the zero point offset. The average zero point offset after 100 completed temperature cycles could be reduced with an arrangement of the O-ring 4, according to the present invention, by approximately 50% compared to the prior art.

Figure 4:
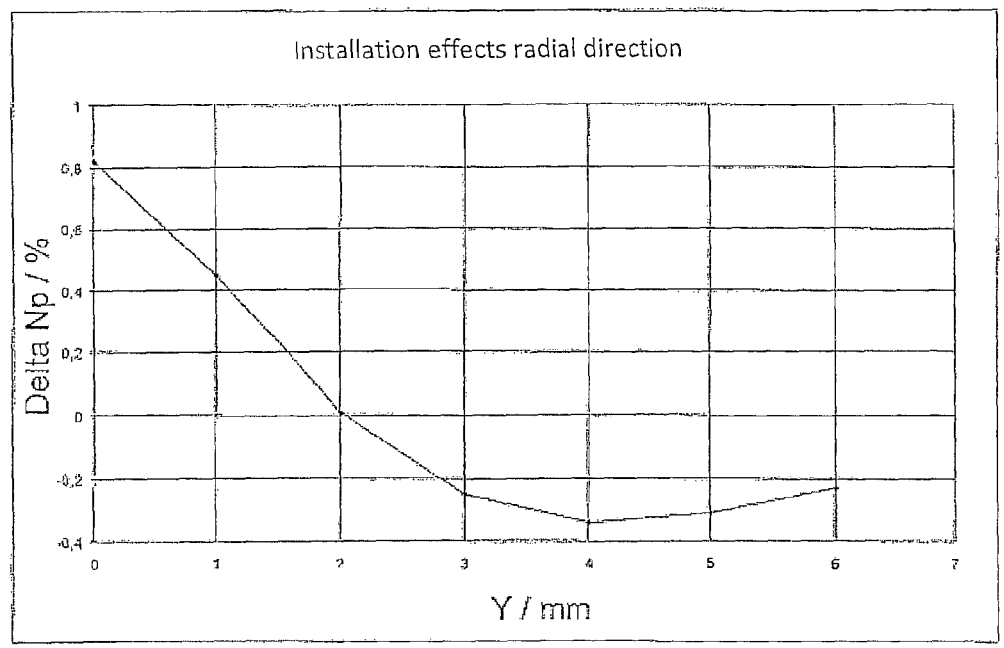
FIG. 4 shows a characteristic curve illustration of the dependency of the zero point offset of the measurement cell depending on an axial installation depth of the sealing element.

Turning to FIG. 4, there is shown the dependency of the zero point offset (Delta Np) in a characteristic curve of the installation depth Y of the sealing element 4.

It can be discerned from the illustrated characteristic curve that depending on the installation depth Y, a zero point offset takes place in the positive as well as the negative direction. The optimal installation depth in the present example for the sealing element 4 is denoted at Y=2 mm. A minimal zero point offset, also called neutral point 36, is constituted for this installation depth Y, so that an optimal temperature and long-term stability of the filling-measurement device can be achieved.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

REFERENCE SIGN LIST

1 Filling-measurement device
2 Housing
3 Measurement cell
4 Sealing element
5 Holding ring
20 Housing body
21 Exterior threading
22 Marginor Protuberance
23 Switch
24 Interior threading
27 shoulder
30 Measurement cell body
32 Membrane
34 Joining location/welding seam
36 Neutral point
51 Exterior threading
53 Compression section
55 Support section
Y Distance/Installation depth

What is claimed is:

1. A filling-level measurement device, comprising:
   (a) a housing; and
   (b) a measurement cell arranged in said housing;
   (c) wherein said measurement cell further comprises an essentially cylindrical measurement cell body with a membrane arranged crosswise relative to a longitudinal axis of said measurement cell body to define a substantially planar interface between said membrane and said measurement cell body, and
   wherein said measurement cell is mounted in said housing by means of a circumferential sealing element having a front-side edge substantially co-planar with said interface, said sealing element arranged between said measurement cell body and said housing; and
   (d) wherein said sealing element is arranged in an axial direction of said measurement cell body at a distance along said longitudinal axis, and said distance is selected from a range of optimal distances; whereby a measurement signal emitted by said measurement cell is substantially independent from a compression of said sealing element when said sealing element is assembled in said housing of said filling-level measurement device.

2. The filling-level measurement device according to claim 1, wherein said sealing element is provided as an O-ring.

3. The filling-level measurement device according to claim 1, wherein said housing comprises a front-side continuous margin.

4. The filling-level measurement device according to claim 3, wherein said sealing element is supported by said margin in a front-side direction.

5. The filling-level measurement device according to claim 1, wherein a holding ring is provided on a back-side of said measurement cell.

6. The filling-level measurement device according to claim 5, wherein said holding ring is provided operative to bias said sealing element with a clamping force on a back-side edge thereof.

7. The filling-level measurement device according to claim wherein said measurement cell is a capacitive measurement cell made of ceramic material.

8. A filling-level measurement device, wherein said device comprises:
   (a) a housing; and
   (b) a measurement cell having a measurement cell body, said measurement cell body positioned in said housing with lateral seal by means of a circumferential sealing element arranged between said measurement cell body and said housing;

wherein said measurement cell body is substantially cylindrical and has a membrane positioned substantially perpendicular to a longitudinal axis of said measurement cell body to define a substantially planar interface between said membrane and said measurement cell body; and wherein said sealing element is positioned in an axial direction of said measurement cell body, said sealing element positioned at a distance along said longitudinal axis, and said distance is selected from a range of optimal distances, with a front-side edge of said sealing element substantially co-planar with said interface; whereby a compression of said sealing element is substantially independent from a compression of said measurement cell when said sealing element is assembled in said housing of said filling-level measurement device.

9. The filling-level measurement device according to claim 8, wherein said sealing element is an O-ring.

10. The filling-level measurement device according to claim 8, wherein said housing comprises a front-side continuous margin.

11. The filling-level measurement device according to claim 10, wherein said sealing element is supported by said margin in a front-side direction.

12. The filling-level measurement device according to claim 8, wherein a holding ring is provided on a back-side of said measurement cell.

13. The filling-level measurement device according to claim 12, wherein said holding ring is provided operative to bias said sealing element with a clamping force on a back-side edge thereof.

14. The filling-level measurement device according claim 8, wherein said measurement cell is a capacitive measurement cell made of ceramic material.

15. A filling-level measurement device, wherein said device comprises:
   (a) a housing;
   (b) a measurement cell having a measurement cell body, said measurement cell body positioned in said housing with lateral seal by means of a circumferential sealing element arranged between said measurement cell body and said housing; and
   (c) a holding ring provided on a back-side of said measurement cell;

wherein said measurement cell body is substantially cylindrical and has a membrane positioned substantially perpendicular to a longitudinal axis of said measurement cell body to define a substantially planar interface between said membrane and said measurement cell body;

wherein said sealing element is positioned in an axial direction of said measurement cell body, said sealing element positioned at a distance along said longitudinal axis, and said distance is selected from a range of optimal distances, with a front-side edge of said sealing element substantially co-planar with said interface; whereby a compression of said sealing element is substantially independent from a compression of said measurement cell when said sealing element is assembled in said housing of said filling-level measurement device; and wherein said holding ring is provided operative to bias said sealing element with a clamping force on a back-side edge thereof.

16. The filling-level measurement device according to claim 15, wherein said sealing element is an O-ring.

17. The filling-level measurement device according to claim 15, wherein said housing comprises a front-side continuous margin.

18. The filling-level measurement device according to claim 17, wherein said sealing element is supported by said margin in a front-side direction.

19. The filling-level measurement device according to claim 15, wherein said measurement cell is a capacitive measurement ea made of ceramic material.

\* \* \* \* \*